B. ANSCHICKS & J. ROSENKRANZ.
Bridle Attachments.
No. 214,866. Patented April 29, 1879.
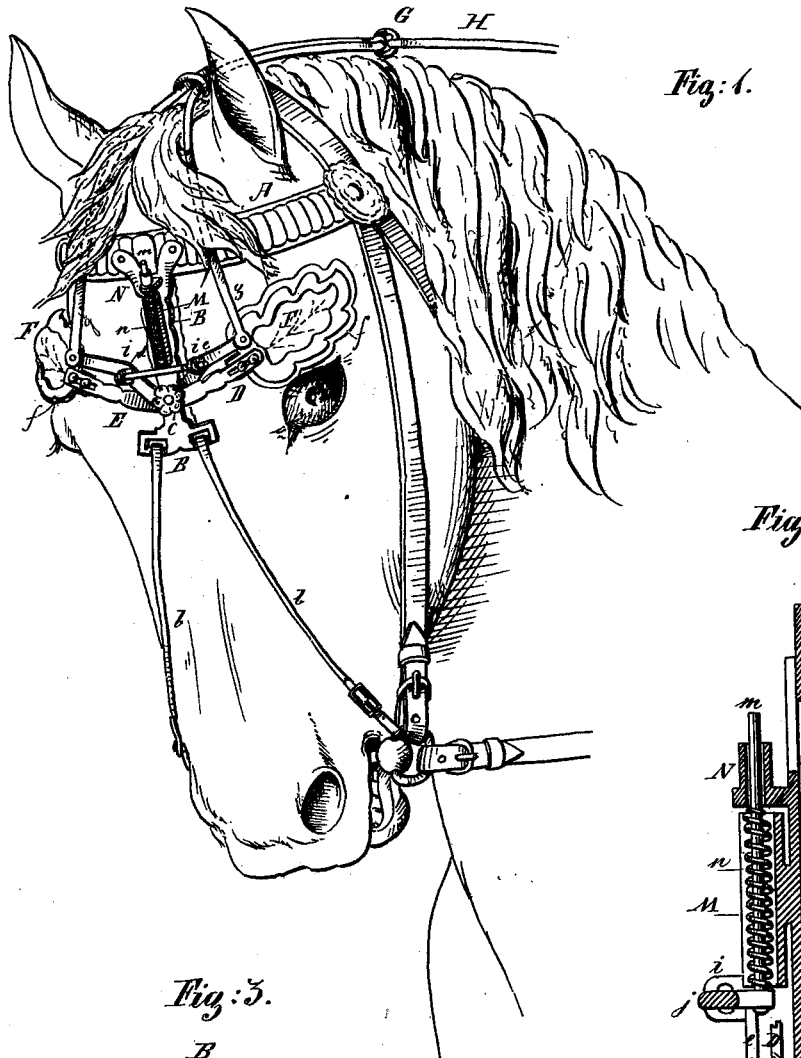
Fig: 1.
Fig: 2.
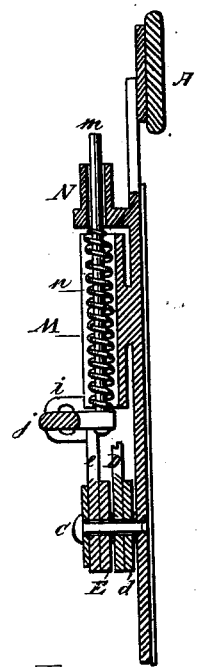
Fig: 3.
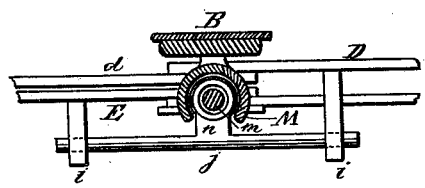
Witnesses.
Ernst Jebsen
Emil H. Frommann
Inventor.
Balthasar Anschicks
Jean Rosenkranz
By Wm H. Lotz
Attorney

UNITED STATES PATENT OFFICE.

BALTHASER ANSCHICKS AND JEAN ROSENKRANZ, OF RANSOM, ILLINOIS.

IMPROVEMENT IN BRIDLE ATTACHMENTS.

Specification forming part of Letters Patent No. 214,866, dated April 29, 1879; application filed March 15, 1879.

*To all whom it may concern:*

Be it known that I, BALTHASER ANSCHICKS and JEAN ROSENKRANZ, both of Ransom, in the county of La Salle and State of Illinois, have invented a new and useful Improvement in Bridle Attachments for Checking Runaway Horses; and we do hereby declare the following to be a full, clear, and exact description thereof, which will enable others skilled in the art to which the invention appertains to make and use the same, reference being had to the accompanying drawings, forming part of this specification.

The nature of our invention relates to devices for checking intractable horses by temporarily blinding them; and it consists in an attachment to the brow-band of the bridle of arms carrying winker-plates, which, by the pulling of a strap, are drawn over the horse's eyes, and which, after releasing said strap, will be raised by a spring to their former position above the eyes, as will be hereinafter more fully described.

In the drawings, Figure 1 represents a horse's head with our blinding device attached. Fig. 2 represents a vertical section through the center of the brow-band and blinding attachment, and Fig. 3 a sectional plan of the latter.

Like letters in the several figures of the drawing designate like parts.

A is the brow-band, having loops to its ends, through which the check-bands of the bridle are passed for holding it in position, and being faced with a metallic band for giving form and firmness to the same.

A plate, B, of ornamental shape is rigidly secured with its upper end upon said brow-plate by riveting, is lined with leather, and slotted in its lower end for connecting two straps, *b*, therewith. These straps are diagonally extended to the bridle-bit rings and are buckled thereto, so as to act as braces for the plate B, for holding the same centrally against the horse's forehead.

Upon a projecting stud, *c*, to the lower end of plate, B, are pivoted arms D *d* and E *e*, placed side by side, each pair of which is rigidly secured together with their pivoted ends in a relative obtuse angular position.

The exterior ends of arms D E are slotted, and secured by two rivets upon curved shields F in a manner to provide for longitudinal adjustment of the same. These shields F carry underneath padded eye-flaps *f*, intended to be drawn over the eyes of the horse, and shaped to cover the same entirely.

The extremities of arms *d e* are connected with the ends of two straps, *g g*, which are extended over the crown of the horse's head, where they are coupled by a ring, G, with the operating-line H. To the middle of arms *d e* are attached turn-loops *i*, and the ends of a cross-bar, *j*, are inserted and have a longitudinal sliding movement therein; and this cross-bar *j*, at its center, is rigidly connected to a vertical rod, *m*.

Upon plate B is secured a slotted tube, M, for holding and protecting a spiral spring, *n*, which surrounds the rod *m*, and with its upper end abuts against a tubular bracket, N, also secured upon plate B, and forming the guide for the upper end of rod *m*. Said spring, by this arrangement, exerts a downward pressure upon cross-bar *j* of sufficient force to lift the padded blinding-shields F to a position above the horse's eyes, and will be contracted for lowering said shields.

The driver, by pulling the line H, will draw the ends of arms *d e* upward, whereby the arms D E, which are relatively connected therewith, will be turned downward, and the shields F will be moved to a position to cover the eyes of the horse, so as to blind the same entirely; and by releasing the line H again, the spring *n*, which had been compressed by the pulling of said line, by its expansion will raise the shields F again to a position above the horse's eyes.

It is a well-known fact that a fractious and unruly horse after blinding will at once become docile and obedient, and therefore the advantages of our device will be appreciated by every person who has to drive or to take care of horses. Under circumstances apt to frighten a horse, as the approach of a railroad-train or a steam fire-engine, which may cause him to run away, this blinding attachment will be of great value.

We are aware that devices have been in existence heretofore in which a curtain was concealed under the brow-strap of the bridle and connected to a line for pulling the same over the horse's eyes; but these could not be removed again from his eyes so readily, and therefore have never come into practical use, while with our arrangement the blinding can be repeated as often as desirable for quieting the horse and changing its temper, and therefore it is very useful also for breaking in and training horses.

Our blinding attachment is very simple in construction and ornamental in appearance, and can be easily applied to any style of bridle.

Having thus described our invention, what we claim as new, and desire to secure by Letters Patent, is—

1. In combination with the brow-band A of a bridle having plate B, the pivotal arms D $d$ and E $e$, with shields F, connected by straps $g$ with line H, and arranged with a spring, $n$, to operate in the manner substantially as set forth.

2. As an attachment to a bridle and the brow-band A thereof, the plate B, pivotal arms D $d$ and E $e$, with shields F and loops $i$, the straps $g$ and line H, cross-bar $j$, rod $m$, spring $n$, and guide-bracket N, all of which to be arranged substantially in the manner described, for the purpose set forth.

3. As an attachment to a bridle, the brow-band A, with plate B and straps $b$, the pivotal arms D $d$ and E $e$, with shields F and loops $i$, straps $g$ and line H, cross-bar $j$, with rod $m$, spring $n$, and guide-bracket N, the same being constructed and arranged substantially in the manner described, for the purpose specified.

B. ANSCHICKS.
JEAN ROSENKRANZ.

Witnesses:
LOUIS A. FEHR,
W. F. BAIRD.